United States Patent [19]

Gleixner et al.

[11] Patent Number: 4,931,683
[45] Date of Patent: Jun. 5, 1990

[54] HOUSING FOR A SMALL MOTOR

[75] Inventors: Ronald Gleixner, Ochsenfurt; Anton Heidenfelder, Wurzburg, both of Fed. Rep. of Germany

[73] Assignee: Siemens Aktiengesellschaft, Berlin and Munich, Fed. Rep. of Germany

[21] Appl. No.: 922,707

[22] Filed: Oct. 24, 1986

[30] Foreign Application Priority Data

Nov. 30, 1985 [DE] Fed. Rep. of Germany ... 8533802[U]

[51] Int. Cl.$^5$ .............................................. H02K 5/04
[52] U.S. Cl. .................................... 310/89; 310/91; 403/22; 411/105; 411/107; 411/166
[58] Field of Search ............... 310/42, 89, 91; 403/21, 403/22; 411/88, 103, 104, 105, 107, 176, 177

[56] References Cited

U.S. PATENT DOCUMENTS

| 495,783 | 4/1893 | Cavallaro | 403/22 |
| 1,680,843 | 8/1928 | Bechaud | 310/91 |
| 2,206,740 | 7/1940 | Burke | 411/176 |
| 2,395,377 | 2/1946 | MacLean | 411/166 |
| 3,177,916 | 4/1965 | Rosan | 411/103 |
| 3,434,521 | 3/1969 | Flora | 411/166 |
| 3,729,040 | 4/1973 | Whiteside et al. | 411/103 |
| 4,426,593 | 1/1984 | Chernoff et al. | 310/91 |

Primary Examiner—Patrick R. Salce
Assistant Examiner—D. L. Rebsch
Attorney, Agent, or Firm—Kenyon & Kenyon

[57] ABSTRACT

The two bearing brackets (4, 5) of a small motor are clamped by means of stud screws (2, 3) against the respective end face of the motor casing (1). The stud screws (2, 3) extend axially by free bolt ends (21, 31) beyond one bearing bracket (5). Onto these free bolt ends (21, 31), a holding frame for the small motor is placed and is fixed against the bearing bracket (5) by means of a holding nut to be screwed onto the free bolt ends (21, 31). The screw heads (22, 23) provided at the stud screw ends are held positively in the one bearing bracket (4) to prevent their rotation with respect to the casing and onto the other, axially projecting free bolt end (21, 31) an attachment nut (23, 33) is screwed applying firmly against the other bearing bracket (5).

5 Claims, 2 Drawing Sheets

HOUSING FOR A SMALL MOTOR

BACKGROUND OF THE INVENTION a. Field of Invention

The invention relates to a small (fractional horsepower) motor with bearing brackets at the axial end faces, which bearing brackets are braced against each other indirectly by means of stud screws extending axially over the length of the motor casing, which screws project by a free bolt and axially over one bearing bracket. A holding nut can be screwed on the belt and for attachment of the small motor to a holding device.

b. Description of the Prior Art

In a known motor the attachment nuts are fixed positively in a depression in one bearing bracket. The stud screws are screwed into the fixed attachment nut by means of their screw head from the end face of the other bearing bracket. Onto the bolt ends projecting axially on the outside beyond the attachment nut, a holding frame for the motor is placed in unilateral abutment on the facing bearing bracket, whereupon the holding the holding frame is tightened against the bearing bracket. Onto the bolt ends projecting axially on the outside beyond the attachment nut, a holding frame for the motor is placed in unilateral abutment on the facing bearing bracket, whereupon the holding frame is tightened against the bearing bracket by screwing a holding nut onto the bolt ends.

SUMMARY OF THE INVENTION

To prevent an accidental loosening of the stud screws, which had already been tightened for the mutual indirect clamping of the bearing brackets, and moreover to be able to ensure a respective minimum loosening torque of the stud screws at the time the holding nuts are screwed on, the invention provides, in a small-size motor of the initially mentioned kind, that the screw head provided at one stud screw end is held positively in one bearing bracket, while on the other, axially projecting free bolt end, an attachment nut is screwed on against the other bearing bracket.

By the new arrangement and fixation of the stud screws in one bearing bracket, and by the mutual bracing of the two bearing brackets from the free bolt end of the stud screws, it can be ensured with simple assembly to be accomplished also by automatic machines that as the holding nuts are being screwed on against the other bearing bracket.

By the new arrangement and fixation of the stud screws in one bearing bracket, and by the mutual bracing of the two bearing brackets from the free bolt end of the stud screws, it can be ensured with simple assembly to be accomplished also by automatic machines that as the holding nuts are being screwed on, the stud screws will not, in an undersirable manner, be turned out of their position in which they mutually clamp the bearing brackets.

An advantageous embodiment of the invention is characterized in that the screw head has a star-shaped outer profile, and the one bearing bracket has an insertion recess for the screw head with a complementary matching star-shaped profile. The star shaped outer profile of the screw head permits a maximum overlap, extensive independence as to tolerance, and, in a manner advantageous for automatic machine manufacture, easy location for the correct feeding and mounting of the stud screw. To facilitate, on the one hand, simple mutual clamping of the bearing brackets, to be accomplished in particular by a machine, as well as the necessary application of force on the attachment nut, and on the other hand to ensure secure fixing of the holding frame on the end face of the bearing bracket, the other bearing bracket is provided with a cutout in the region of the attachment nut so that it is flush against the other bearing bracket and freely accessible.

BRIEF DESCRIPTION OF THE DRAWINGS

In the following, the invention will be explained more specifically with reference to an embodiment illustrated schematically in the drawing, in which.

DETAILED DESCRIPTION OF THE INVENTION

Figure 1:
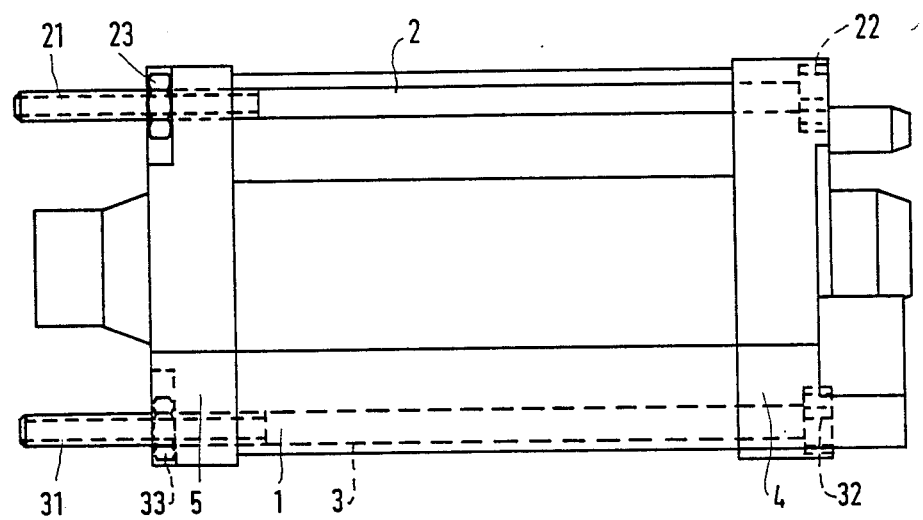
FIG. 1 shows an axial top view of a motor vehicle seat adjusting motor.
Figure 2:
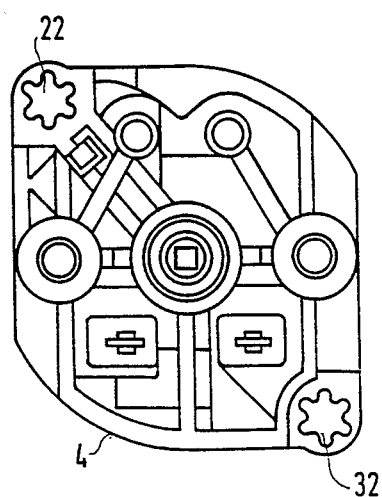
FIG. 2 shows an end-face top view of the right end face of the small motor of FIG. 1 with a first screw head profile.
Figure 3:
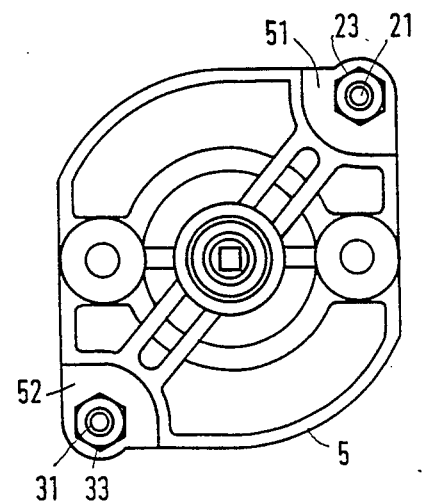
FIG. 3 shows an end-face top view of the left end face of the small motor of FIG. 1.
Figure 4:
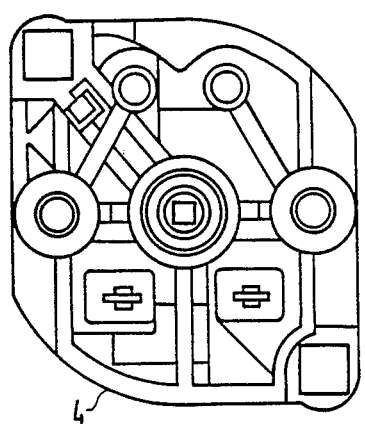
FIG. 4 shows an end-face top view of the right end face of the small motor of FIG. 1 with a second screw head profile.

FIG. 1 shows a small motor for a motor vehicle seat adjustment by motor.

Against the two end faces of the motor easing 1, two bearing brackets 4, 5, preferably injection-molded of plastic, are clamped by means of stud screws 2, 3. The stud screws 2, 3 are fixed positively in one bearing bracket 4 by means of their integrally formed screw heads 22, 32. For this purpose, the screw heads have a star-shaped outer profile with substantially parallel sides, and the bearing bracket 4 has insertion recesses open on the end face with complementary matching star-shaped recess for the positive retention of the screw head with a bottom pass-through opening for the stud screw connected to the screw head.

The outer and inner tips of the star define two circles with an outer and an inner diameter respectively, having a ratio which is preferably greater than 1.5.

For the indirect mutual clamping of the two bearing brackets 4 and 5, attachment nuts 23, 33 are screwed onto the stud screws 2, 3 which have been passed through the bottom openings of both bearing brackets and have been inserted positively into the recesses in the one bearing bracket 4. The attachment nuts 23, 33 are screwed firmly to abut the bearing bracket 5 from the left screw ends 21, 31 which are axially projecting beyond the other bearing bracket 5. In their end position the attachment screws 23, 33 lie in cutouts 51, 52 of the bearing bracket 5, in such a way that on the one hand they are easily accessible for a screwing tool and, on the other hand, terminate axially flush with the remaining end face of the other bearing bracket 5 and thus do not hinder the abutment of a holding frame (not shown) for the small motor, to be screwed against the other bearing bracket 5 by means of holding screws.

Figure 5:
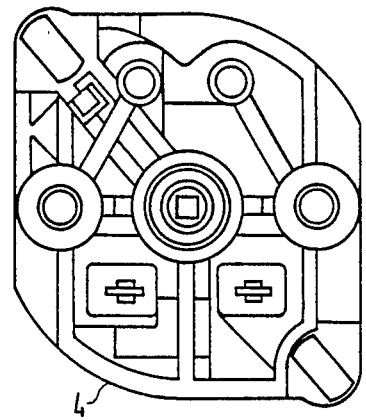
FIG. 5 shows an end-face top view of the right end face of the small motor of FIG. 1 with a third screw head profile.
Figure 6:
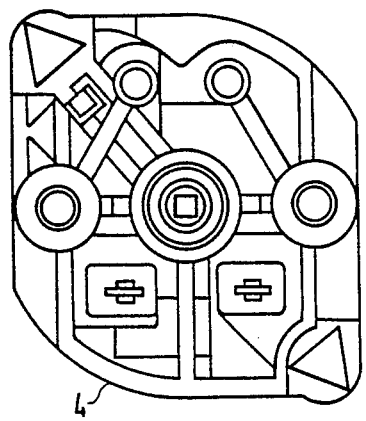
FIG. 6 shows an end-face top view of the right end face of the small motor of FIG. 1 with a fourth screw head profile.
Figure 7:
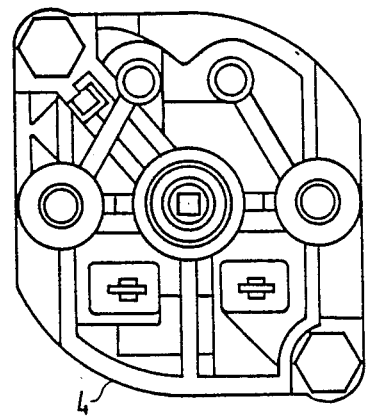
FIG. 7 shows an endface top view of the right end face of the small motor of FIG. 1 with a fifth screw head profile.

FIGS. 4 to 7 show other appropriate screw head profiles which because of their head shape are easy to manufacture and ensure the transmission of a high tightening torque. More particularly, in FIG. 4, a quadrangular or a square screw head, is shown. In FIG. 5 a screw head with two relatively long longitudinal flanks is shown. In FIG. 6 a triangular screw head is shown. Finally FIG. 7 shows a hexagonal screw head.

What is claimed is:

1. A small motor comprising:
   a motor casing (1) with two axial ends faces;
   first and second bearing brackets (4, 5) disposed at said end faces;
   stud screws (2, 3) extending axially along said motor casing for bracing indirectly said brackets together, said stud screws having screw heads (22, 32) with a star-shaped outer profile at one end, said first bearing bracket having insertion recesses with a complementary star-shaped profile matching said screw heads for positively holding said screw heads, said stud screws further having free screw ends (21, 31) projecting axially beyond said second bearing bracket (5) for attaching said motor to a holding device; and
   attachment nuts (23, 33) mounted on said free screw ends (21, 31) and firmly applied against said second bearing bracket (5).

2. A small motor comprising:
   a motor casing (1) with two axial end faces;
   first and second bearing brackets (4, 5) outer disposed at said end faces;
   stud screws (2, 3) extending axially along said motor casing for bracing indirectly said brackets together, said stud screws having screw heads (22, 32) with an outer profile defined by two parallel longitudinal flanks at one end, said first bearing bracket having insertion recesses with a complementary profile matching said screw heads for positively holding said screw heads (4), said stud screws further having free screw ends (21, 31) projecting axially beyond said second bearing bracket (5) for attaching said motor to a holding device; and
   attachment nuts (23, 33) mounted on said free screw ends (21, 31) and firmly applied against said second bearing bracket (5).

3. The small motor according to claim 1, wherein a star-shaped outer profile is provided with flanks having substantially parallel sides, wherein said star-shaped profile has a plurality of outer and inner troughs defining respectively an outer and inner circle with a corresponding outer and inner diameter.

4. The small motor according to claim 3, wherein the ratio of the outer diameter to the inner diameter is greater than 1.5.

5. A small motor comprising:
   a motor casing (1) with two axial end faces;
   first and second bearing brackets (4, 5) disposed at said end faces;
   stud screws (2, 3) extending axially along said motor casing for bracing indirectly said brackets together, said stud screws having screw heads (22, 32) with a triangular outer profile at one end, said bearing bracket having insertion recesses with a complementary triangular profile matching said screw heads for positively holding said screw heads, said stud screws further having free screw ends (21, 31) projecting axially beyond said second bearing bracket (5) for attaching said motor to a holding device; and
   attachment nuts (23, 33) mounted on said free screw ends (21, 31) and firmly applied against said second bearing bracket (5).

* * * * *